United States Patent [19]

Benton et al.

[11] Patent Number: 4,721,275
[45] Date of Patent: Jan. 26, 1988

[54] STEADY LEVELORS

[76] Inventors: David B. Benton, 3200 N. Chicksaw, Beverly Hills, Fla. 32665; George Spector, 233 Broadway RM 3815, New York, N.Y. 10007

[21] Appl. No.: 943,714

[22] Filed: Dec. 19, 1986

[51] Int. Cl.⁴ ............................................. F16M 11/24
[52] U.S. Cl. ........................... 248/188.4; 248/188.9; 248/359.1; 248/650; 248/677
[58] Field of Search ................ 248/188.4, 649, 650, 248/677, 188.8, 188.9, 359.1

[56] References Cited

U.S. PATENT DOCUMENTS

| 1,490,978 | 4/1924 | Levt et al. | 248/359.1 |
| 2,214,322 | 9/1940 | Bryant | 248/650 |
| 2,302,134 | 11/1942 | McNabb | 248/649 |
| 2,496,539 | 2/1950 | Husted | 248/188.9 X |
| 2,680,326 | 6/1954 | Sultan | 248/188.4 |
| 2,725,667 | 12/1955 | Ingarra | 248/188.4 |
| 3,260,510 | 7/1966 | Ranson | 248/188.4 X |

FOREIGN PATENT DOCUMENTS

| 727876 | 2/1966 | Canada | 248/188.9 |
| 2358136 | 9/1974 | Fed. Rep. of Germany | 248/188.4 |
| 2600782 | 7/1977 | Fed. Rep. of Germany | 248/188.9 |
| 572126 | 5/1924 | France | 248/188.4 |
| 891875 | 3/1962 | United Kingdom | 248/188.4 |

Primary Examiner—J. Franklin Foss
Assistant Examiner—David L. Talbott

[57] ABSTRACT

A steady leveling device for a tall narrow piece of furniture is provided and consists of an L-shaped bracket mounted to a corner of a base of the furniture and a threaded rod having a point that is adjustable in the bracket so that the point can penetrate through carpet, underlayment and dig into floor underneath to stabilize the furniture.

1 Claim, 5 Drawing Figures

STEADY LEVELORS

BACKGROUND OF THE INVENTION

The instant invention relates generally to support brackets and more specifically it relates to a steady leveling device.

Numerous support brackets have been provided in prior art that are adapted to support large articles on horizontal surfaces which may have uneven contours. For example, U.S. Pat. Nos. 2,680,326; 3,814,363 and 4,015,808 all are illustrative of such prior art. While these units may be suitable for the particular purpose to which they address, they would not be as suitable for the purposes of the present invention as heretofore described.

SUMMARY OF THE INVENTION

A primary object of the present invention is to provide a steady leveling device that will overcome the shortcomings of the prior art devices.

Another object is to provide a steady leveling device that will act as a stable base for a tall narrow piece of furniture when the furniture is used on thick rugs.

An additional object is to provide a steady leveling device that can be attached to underside of the furniture without laying it down by a front driven mounting screw.

A further object is to provide a steady leveling device that is simple and easy to use.

A still further object is to provide a steady leveling device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
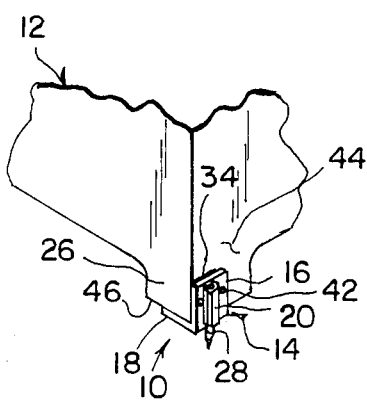
FIG. 1 is a perspective view of a portion of a piece of furniture equipped with the invention.
Figure 2:
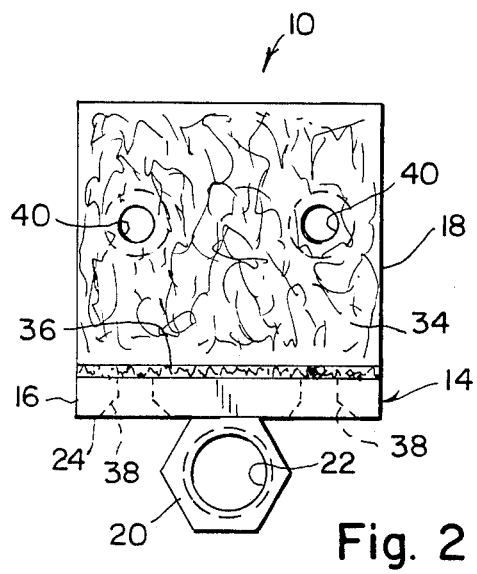
FIG. 2 is a top view of the invention.
Figure 3:
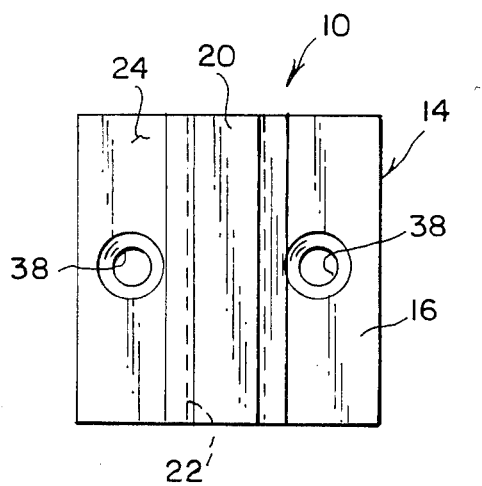
FIG. 3 is a front view thereof.
Figure 4:
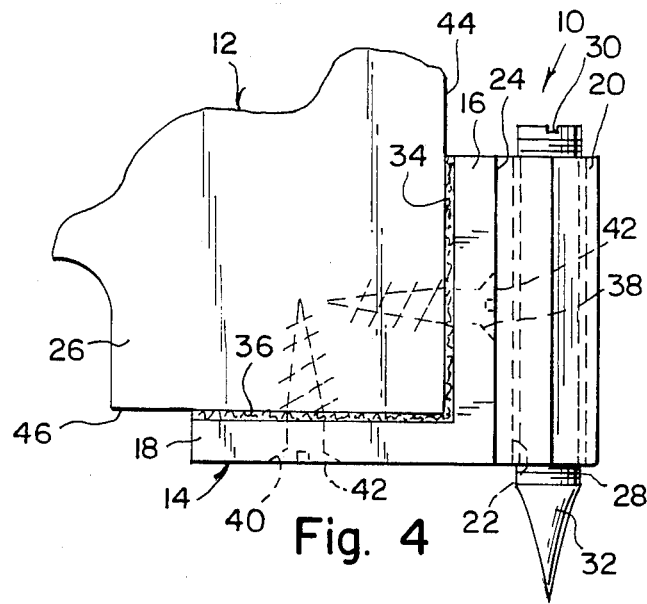
FIG. 4 is a side view thereof.

Turning now descriptively to the drawings, in which similar reference characters denote similar elements throughout the several views, FIGS. 1 through 4 illustrate a steady leveling device 10 for a tall narrow piece of furniture 12, such as a grandfather clock, a curio cabinet and gun cabinets when used on thick rugs. The device 10 consists of an L-shaped bracket 14 that has a vertical flange 16 and a horizontal flange 18. A hexagonal sleeve 20 that has a threaded aperture 22 therethrough is mounted vertically to outer surface 24 of the vertical flange 16 of the L-shaped bracket 14. The L-shaped bracket is mounted to a corner of a base 26 of the furniture 12. A threaded rod 28 is provided having an adjustment operating slot 30 at upper end and a point 32 at lower end. The rod 28 is rotatably journaled in the aperture 22 of the hexagonal sleeve 20 so that the point 32 can penetrate through carpet, underlayment and dig into floor underneath (not shown) to stabilize the base 26 of the furniture 12.

An L-shaped sheet of padding 34, such as cork or felt, is secured to inner surface 36 of the L-shaped bracket 14 to cushion the L-shaped bracket and protect the base 26 of the furniture 12.

The vertical flange 16 has a first pair of spaced apart counter sunk holes 38 and the horizontal flange 18 has a second pair of spaced apart counter sunk holes 40. A pair of mounting screws 42 are provided which may be received through the first pair of spaced apart counter sunk holes 38 to secure the vertical flange 16 to vertical surface 44 of the base 26 of the furniture 12. The pair of mounting screws 42 may be also received through the second pair of spaced apart counter sunk holes 40 to secure the horizontal flange 18 to horizontal surface 46 of the base 26 of the furniture 12.

Figure 5:
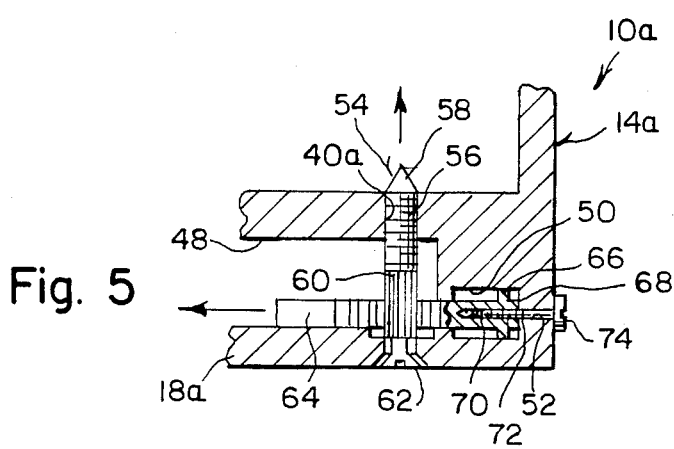
FIG. 5 is a cross sectional side view with parts broken away modification showing a front driven mounting screw therein.

FIG. 5 shows a modified steady leveling device 10a that includes the horizontal flange 18a of the L-shaped bracket 14a having a hollow chamber 48 therein with a vertical counter sunk threaded hole 40a therethrough. A horizontal slot 50 is adjacent the hole 40a with a horizontal hole 52 extending outwardly therefrom. A mounting screw 54 is received through the vertical hole 40a. The screw 54 has an upper threaded portion 56 with point 58 and a lower pinion portion 60 with an adjustment operating slotted head 62. A rack member 64 is provided having a stop portion 66 at one end 68 and a threaded aperture 70 within the end 68. The rack member 64 extends horizontally outwardly from the slot 50 into the hollow chamber 48 with the stop portion 66 captured within the slot 50 and the rack member 64 in engagement with the pinion portion 60 of the mounting screw 54. A thin threaded screw 72 is also provided that has a slotted head 74. The thin screw 72 is placed through the horizontal hole 52 and received within the threaded aperture 70 of the rack member 64. When the slotted head 74 is turned the rack member 64 will travel horizontally to turn the mounting screw 54 to travel upward to secure the horizontal flange 18a to horizontal surface 46 of the base 26 of the furniture 12.

While certain novel features of this invention have been shown and described and are pointed out in the annexed claims, it will be understood that various omissions, substitutions and changes in the forms and details of the device illustrated and in its operation can be made by those skilled in the art without department from the spirit of the invention.

What is claimed is:

1. A steady leveling device for a tall narrow piece of furniture comprising:
    (a) an L-shaped bracket having a vertical flange and a horizontal flange;
    (b) a hexagonal sleeve having a threaded aperture therethrough, said sleeve mounted vertically to outer surface of said vertical flange of said L-shaped bracket;
    (c) means for mounting said L-shaped bracket to a corner of a base of the furniture;
    (d) a threaded rod having an adjustment operating slot at upper end and a point at lower end, said rod rotatably journaled in said aperture of said hexagonal sleeve so that said point can penetrate through carpet, underlayment and dig into floor underneath to stabilize the base of the furniture;

(e) said horizontal flange of said L-shaped bracket having a hollow chamber therein with a vertical counter sunk threaded hole therethrough and a horizontal slot adjacent said holes with a horizontal hole extending outwardly therefrom;

(f) a mounting screw received through said vertical hole, said screw having an upper threaded portion with point and lower pinion portion with an adjustment operating slotted head;

(g) a rack member having a stop portion at one end and a threaded aperture within said end, said rack member extending horizontally outwardly from said slot into said hollow chamber with said stop portion captured within said slot and said rack member in engagement with said pinion portion of said mounting screw; and (h) a thin threaded screw having a slotted head, said thin screw placed through said horizontal hole and received within said threaded aperture of said rack member whereby when said threaded aperture of said rack member will travel horizontally to turn said mounting screw to travel upward to secure said horizonal flange to horizonal surface of the base of the furniture.

* * * * *